United States Patent [19]

Tellert

[11] Patent Number: 4,854,433
[45] Date of Patent: Aug. 8, 1989

[54] AUTOMATIC CLUTCH ACTUATION SYSTEM WITH PROGRAM CONTROL USING PLURAL FUNCTION GENERATORS

[75] Inventor: Rudy Tellert, Schweinfurt, Fed. Rep. of Germany

[73] Assignee: Sachs-Systemtechnik GmbH

[21] Appl. No.: 482,158

[22] Filed: Apr. 5, 1983

[30] Foreign Application Priority Data

Apr. 20, 1982 [DE] Fed. Rep. of Germany ....... 3214494

[51] Int. Cl.$^4$ .................. B60K 41/22; B60K 41/28
[52] U.S. Cl. ....................... 192/0.033; 192/0.052; 192/0.076; 192/3.58
[58] Field of Search .............. 192/0.033, 0.052, 0.076, 192/0.975, 3.58, 103 F, 103 R

[56] References Cited

U.S. PATENT DOCUMENTS

| | | | |
|---|---|---|---|
| 4,200,175 | 4/1980 | Dick | 192/0.033 |
| 4,343,387 | 8/1982 | Hofbauer | 192/103 C X |
| 4,344,513 | 8/1982 | Etienne | 192/0.052 X |
| 4,403,682 | 9/1983 | Norris et al. | 192/3.58 X |
| 4,413,714 | 11/1983 | Windsor | 192/0.033 |
| 4,432,445 | 2/1984 | Windsor | 192/0.076 |
| 4,434,879 | 3/1984 | Lutz et al. | 192/0.052 |
| 4,473,143 | 9/1984 | Windsor | 192/0.076 X |
| 4,475,637 | 10/1984 | Oguma et al. | 192/0.052 |

FOREIGN PATENT DOCUMENTS

| | | | |
|---|---|---|---|
| 2620960 | 12/1976 | Fed. Rep. of Germany. | |
| 3028250 | 7/1980 | Fed. Rep. of Germany. | |
| 2012892 | 8/1979 | United Kingdom. | |
| 2066919 | 7/1981 | United Kingdom. | |
| 2079888 | 1/1982 | United Kingdom | 192/0.076 |
| 2079889 | 1/1982 | United Kingdom | 192/0.033 |
| 2080910 | 2/1982 | United Kingdom | 192/3.58 |

Primary Examiner—Rodney H. Bonck
Attorney, Agent, or Firm—Toren, McGeady & Associates

[57] ABSTRACT

For the automatic actuation of a friction clutch arranged in the torque transmission path between an engine and a change-speed gearbox of a motor vehicle an actuating element of the clutch is coupled to a controllable drive device which moves the actuating element between a clutch-release position, in which the clutch is completely released, and a clutch engagement position in which the clutch is completely engaged. The position of the actuating element in the slipping range between a position of commencing torque transmission and the engaged position is adjusted by a program control, which responds to the engine rotation rate and controls the clutch engagement operation of the drive device, according to a position characteristic provided by means of a first function generator, in starting, as a function of the engine rotation rate. The program control comprises a second function generator controlling the position of the actuating element independently of the first function generator. The second function generator provides a plurality of position characteristics displacing the actuating element as a function of time at different speeds over the slipping rate. The program control in dependence upon the engine rotation rate and the input rotation rate of an input shaft of the change-speed gearbox engages a comparatively faster position characteristic when the engine rotation rate is higher than the input rotation rate of the change-speed gearbox, and engages a comparatively slower position characteristic when the engine rotation rate is lower than the input rotation rate.

9 Claims, 2 Drawing Sheets

AUTOMATIC CLUTCH ACTUATION SYSTEM WITH PROGRAM CONTROL USING PLURAL FUNCTION GENERATORS

BACKGROUND OF THE INVENTION

The present invention is directed to a system for the automatic actuation of a friction clutch arranged in the torque transmission path between engine and change-speed gearbox of a motor vehicle.

A system for the automatic actuation of a motor vehicle clutch is known from German Patent Application P 30 28 250.9. With this system the actuating element of the clutch is movable by a controllable drive device between a clutch release position, in which the clutch is disengaged irrespective of rotation rate, and a clutch engagement position in which the clutch is completely engaged. The position of the actuating element in the slipping range between a position of commencing torque transmission and the clutch engagement position is settable by a program control which responds to the engine rotation rate and controls the clutch engagement operation of the drive device according to a position characteristic provided by a function generator, as a function of the engine rotation rate. The clutch is disengaged when the shift lever of the change-speed gear is actuated for the initiation of the gear change or the engine rotation rate drops below a rotation rate value in the region of or below the idling rate. The function generator becomes effective in clutch engagement, especially during starting away, and engages the clutch in dependence upon the engine rotation rate, which rises in starting away.

The positioning characteristic suitably dimensioned for jerk-free clutch engagement in starting away, with which the function generator shifts the actuating element of the clutch, has proved to be in need of improvement in clutch engagement after gear change during driving of the vehicle. In some driving situations the clutch engagement does not take place without jerks.

It is the primary object of the present invention to improve the initially explained automatic clutch actuation system so that clutch engagement occurs smoothly, both in starting and in gear-changing during driving.

SUMMARY OF THE INVENTION

In accordance with the invention the program control comprises a second function generator which controls the position of the actuating element independently of the first function generator responding to the engine output rotation rate. The second function generator provides a plurality of position characteristics displacing the actuating element as a function of the time at different speeds over the slipping range. The program control selects in dependence upon the engine output rotation rate and the gear input rotation rate of an input shaft of the change-speed gearbox comparatively faster position characteristic when the engine output rotation rate is higher than the gear input rotation rate and a comparatively slower position characteristic when the engine output rotation rate is lower than the gear input rotation rate.

The positioning of the actuating element and thus the clutch engagement take place during driving, not as a function of the engine output rotation rate, but according to predetermined positioning speed programs. The positioning speed can be provided to be constant over the slipping range of the clutch; it can however also vary continuously in dependence upon the momentary position of the actuating element in the slipping range. The program control determines the time period in which the slipping range of the clutch is passed through, or the speed with which the actuating element moves, in dependence upon the ratio of the engine output rotation rate to the gear input rotation rate. If the engine output rotation rate is lower than the input rotation rate, on clutch engagement the vehicle is braked and its occupants are projected forward. Clutch engagement is effected slowly in this operational condition. If the engine output rotation rate is higher than the gear input rotation rate the vehicle is accelerated on clutch engagement. In this case the clutch is engaged quickly in order to avoid undesired increase of the engine output rotation rate with the clutch disengaged, that is "rotation rate overshoot".

The gear input rotation rate of the input shaft of the gearbox can be measured directly by means of a tachometer, for example a pulse emitter providing a pulse frequency proportional to the rotational rate. In conventional transmission constructions the input shaft of the gearbox is accessible only with relatively great construction expense, if at all. In a preferred form of embodiment thereof the tachometer is coupled with the drive-output shaft for example through the speedometer drive shaft, which is present in any case. A computer circuit, for example a multiplier circuit, multiplies the signal delivered by this tachometer with a factor which represents the ratio of the gear input rotation rate to the gear output rotation rate of the change-speed gear for each of the gearbox ratios. Thus the computer circuit delivers a signal proportional to the gear input rotation rate.

In a preferred embodiment it is provided that the program control, at least at engine output rotation rates above the gear input rotation rate, responds to the gear shift position of the change-speed gear and for each gear shift position or for groups of gear shift positions selects different position characteristics of the second function generator. The program control selects faster position characteristics with increasing ratio of the gear output rate to the gear input rotation rate. Thus the speed of clutch engagement is controlled in dependence upon the engaged gear ratio. The higher the ratio of the gear output rotation is to the gear input rotation rate there will be, less jerky torque variations caused by clutch engagement act upon the vehicle, and the more quickly can the clutch be engaged.

A separate position characteristic of the second function generator is expediently allocated to each gear shift position of the change-speed gearbox. Its position characteristics of the forward gear positions, with the exception of the forward gear position with the lowest ratio of output to input rotation rate, are selected when the gear input rotation rate of the change-speed gear is above a predetermined rotation rate value. This predetermined rotation rate threshold can lie for example at 800 r.p.m. and thus lies above the idling rate.

A further improvement is brought by a third function generator the position characteristic of which is superimposed upon the position characteristic of the first function generator which responds to the engine rotation rate. The program control enables the third function generator in addition to the first function generator when the drive-output rotation rate of the change-speed gearbox is higher than a predetermined value, simultaneously a forward gear is engaged having a ratio of output rotation speed to input rotation rate of the change-speed gearbox higher than the lowest ratio of the forward gears and furthermore at the same time the input rotation rate of the change-speed gearbox is lower than a predetermined value. The third function generator shortens unnecessarily long slipping times in starting. Furthermore in slow driving in the higher gears the clutch is engaged continuously after the gear change, even if the engine rotation rate is not accelerated by depression of the accelerator pedal.

The program control enables the third function generator independently of the engaged gear ratio after the elapse of a prescribed time period, in addition to the first function generator. This measure prevents excessively slow engagement of the clutch in starting on a hill or from stationary, if there is only slight acceleration and the clutch would be thermally loaded by slow slipping operation. Since the clutch is more heavily thermally loaded with rising starting rotation rate, it is preferably provided that the time period after which the program control enables the third function generator is provided in dependence upon the square of the engine rotation rate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
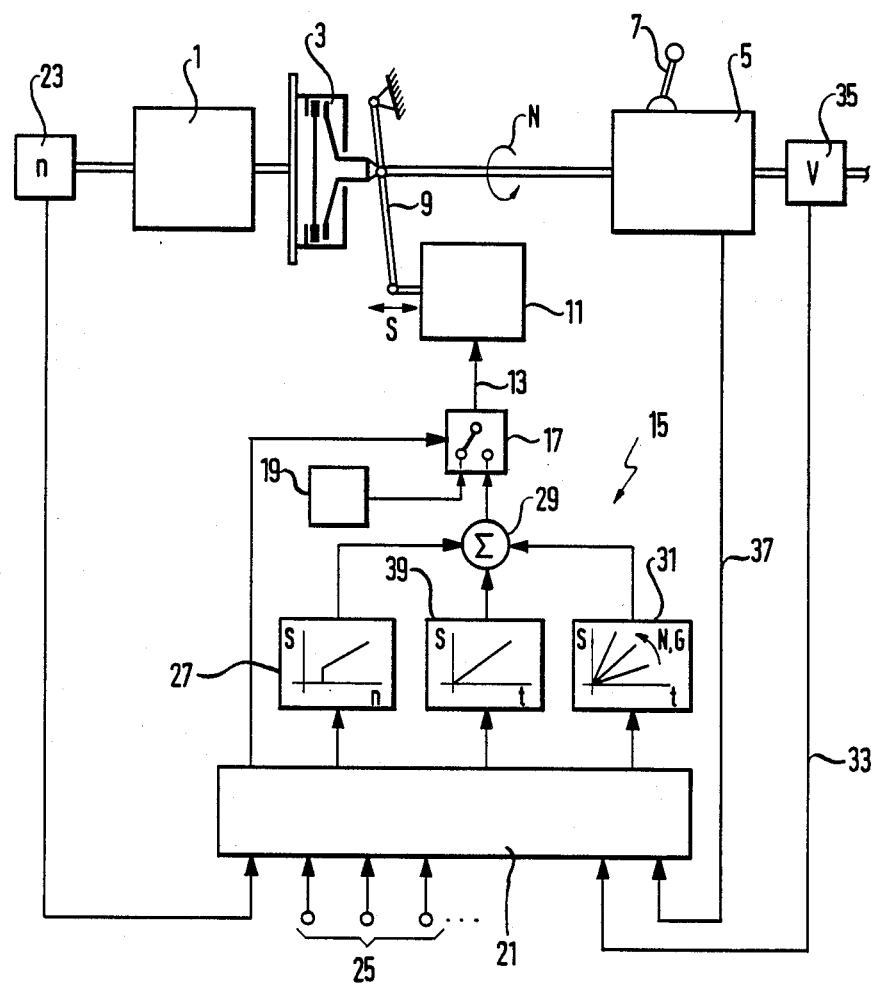
FIG. 1 shows a diagrammatic block circuit diagram of an automatic clutch-actuation system.

In FIG. 1 an engine 1 of a motor vehicle, through a dry-plate friction clutch 3, drives a multi-ratio gearbox 5, the gears of which are shifted by means of a gear-shift lever 7 or a servo-control system (not shown). The clutch 3 is of conventional construction and is normally held in engagement by springs (not shown). With an actuation element 9 of the clutch a servo-drive 11 is connected which adjusts the actual position of the actuating element 9 in accordance with a reference or nominal value signal supplied through a lead 13 from a program control, designated generally by 15, to a desired position. The servo-drive 11 comprises for example an electric motor which controls the actual position of the actuating element 9 in dependence upon a nominal - actual value comparison.

For the disengagement of the clutch 3 a nominal value signal is fed to the servo-drive 11 through an electronic controllable change-over switch 17 from a single source 19 and moves the actuating element 9 into the release position of the clutch 3. The change-over switch 17 is controlled by a clutch release control 21 which responds to several clutch-release conditions, as explained for example in German Patent Application P 30 28 250. Clutch-release conditions are for example the actuation of a switch contact arranged on the gear shift lever 7 and operated when initiating the gear change, or the dropping of the engine rotation rate n below a predetermined rotation rate on braking of the vehicle. The engine rotation rate n is detected by means of a tachometer 23. Appropriate signal emitters for the clutch-release conditions are connected to inputs 25 of the clutch-release control 21. If one of the clutch-release conditions is fulfilled, the clutch-release control 21 switches the change-over switch 17 into its first position connecting the signal source 19 with the lead 13, whereby the servo-drive 11 disengages the clutch 3 quickly and completely.

The clutch-release operation is controlled, in starting from stationary, in dependence upon the engine rotation rate n detected by means of the tachometer 23. The tachometer 23 provides a rotation-rate-proportional signal, preferably with brief time delay, to a first function generator 27 of the programme control 15. The output signal of the first function generator 27 varies in dependence upon the engine rotation rate, and is fed via an adder stage 29 through the second position of the change-over switch 17 to the servo-drive 11. The clutch-release control 21 switches the change-over switch 17 into the second position when none of the clutch-release conditions is fulfilled, whereby the clutch 3, on throttle opening by pressing the accelerator pedal and thus on increasing of the engine rotation rate, is engaged in accordance with the actuating element displacement engine rotation rate characteristic predetermined by the first function generator 27. As represented in FIG. 1 by a diagrammatic illustration at 27, the clutch engagement operation proceeds as follows: With the increase of engine output rotation rate n on throttle opening the function generator 27, on exceeding of a predetermined engine rotation rate, delivers a suddenly varying position nominal value signal is which quickly controls the servo-drive 11 into a position of commencing torque transmission. On further increase of engine rotation rate n a position nominal value signal for example in direct proportion to the engine rotation rate is emitted which the servo-drive 11 follows and correspondingly shifts the actuating element 9. The slipping range of the clutch 3 until complete engagement is thus run through in dependence upon the engine rotation rate.

In gear-changing during driving the rotation rate-dependent engagement of the clutch can lead to jerky acceleration or retardation of the vehicle. In these engagement situations the engaging of the clutch is controlled by a second function generator 31 in dependence upon the rotation rate N of the input shaft of the gearbox 5. The input rotation rate N of the gearbox 5 can be detected directly by means of a tachometer or, which is frequently desired for design reasons, derived from the output rotation rate of the gearbox 5, especially the speedometer output rotation rate, by multiplication with a factor corresponding with the transmission ratio of the input rotation rate to the output rotation rate of the gearbox 5. In FIG. 1 a signal from a tachometer 35, proportional to the output rotation rate of the gearbox 5, is fed by way of a lead 33 to the clutch-release control 21. A lead 37 delivers signals corresponding to the actually engaged ratio of the gearbox 5 to the clutch-release control 21. Through the adder stage 29 and the change-over switch 17 the function generator 31 controls the servo-drive 11 in place of the function generator 27 if the input rotation rate N of the gearbox 5 lies above a predetermine rotation rate value, for example 800 r.p.m. The function generator 31 provides several time-dependent predetermined speed program, which as shown diagrammatically at 31 prescribe the position nominal value s for the servo-drive 11 in dependence upon the time t. These speed programms or position characteristics are so dimensioned that the slipping range of the clutch 3 is run through slowly if the engine rotation rate n is lower than the input rotation rate N of the gearbox 5, whereas the slipping range of the clutch 3 is run through quickly if the engine rotation rate n is higher than the input rotation rate N. In the case of engine rotation rates n below the gear input rotation rate N the vehicle is braked by the engagement of the clutch, so that the engagement takes place smoothly. In the case of an engine rotation rate n higher than the gear input rotation rate N the vehicle is accelerated analogously with throttle opening, without however the occurrence of "rotation rate overshoot" during gear changing.

The speed of clutch engagement of the function generator 31 is additionally controlled in dependence upon the gear engaged. The clutch engagement takes place most quickly in the highest gear, in which the ratio of the drive-output rate to the input rotation rate is highest and sudden variations of the torque transmitted by the clutch 3 have least effect upon the vehicle. In the lower gears the clutch 3 is engaged correspondingly more slowly.

While the function generator 31 controls the servo-drive 11 independently of the function generator 27, for specific start-away situations a third function generator 39 can be provided, the position nominal value signals of which are superimposed upon the position characteristic signals of the function generator 27 in accordance with a time-dependently predetermined speed programme and/or a time dependent position characteristic. With the aid of the function generator 39 long slipping times of the clutch in slow starting are prevented. In slow starting the engine rotation rate rises only slowly, so that the function generator 27 engages the clutch only slowly. In these situations the function generator 39 ensures that the clutch is engaged continuously with predetermined speed of engagement. The function generator 39 is engaged by the clutch-release control 21 when the second or a higher gear is engaged and the drive-output rotation rate of the gearbox 5 exceeds a value for example corresponding to a driving speed of at least 2 km. per hour and furthermore the gear input rotation rate N remains below the predetermined value as explained above, that is for example is lower than 800 revolutions per minute.

Similar situations which can lead to thermal damage to the clutch 3 can arise in hill-starting or due to deliberate slipping of the clutch by corresponding actuation of the accelerator pedal. In order to prevent this it is provided that the clutch-release control 21 enables the function generator 39 after a predetermined period of time, for example 15 seconds, and thus causes the engagement of the clutch. This time period can be varied, especially in dependence upon the engine rotation rate, since the thermal loading of the clutch increases with rising engine rotation rate. By way of example a square dependence of the engagement delay upon the engine rotation rate is suitable.

A typical clutch program prescribed by the clutch-release control 21 satisfies the following conditions:

Clutch release: when gear shift lever 7 being actuated or engine rotation raet n below 500 r.p.m. or when second or higher gear engaged and driving speed below 2 km.p.h. or when accelerator pedal not actuated with freewheel function in action and second or higher gear engaged.

Start program of the function generator 27 when first or reverse gear is engaged.

Start program of the function generator 39 additionally to the start program of the function generator 27, when second or a higher gear is engaged, the driving speed is higher than 2 km.p.h. and the input rotation rate N is lower than 800 r.p.m. or when first or reverse gear is engaged and 15 seconds have elapsed after enabling the function generator 27.

Gear change program the function generator 31 when the first or reverse gear is engaged and the driving speed is higher than 15 k.p.h. or when second or a higher gear is engaged and the input rotation rate N of the gearbox 5 amounts to more than 800 r.p.m.

Figure 2:
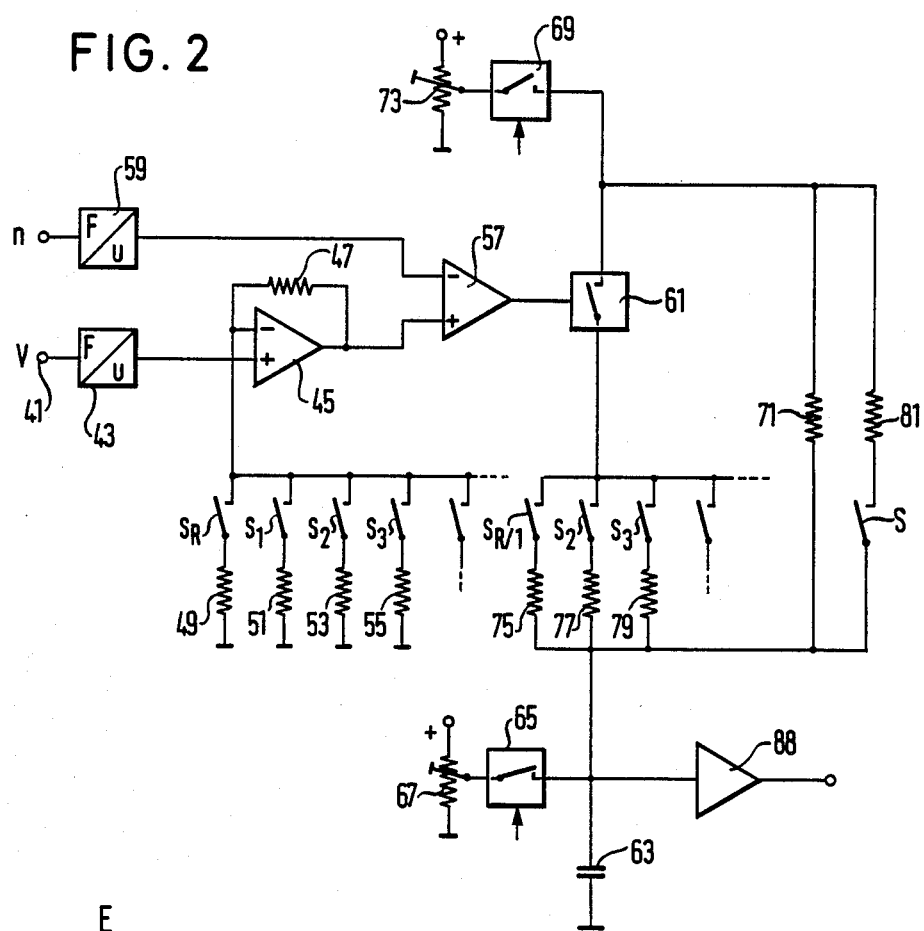
FIG. 2 shows a block circuit diagram of a function generator which engages the clutch in dependence upon time with a predetermined speed of engagement, and FIGS. 3a and b show time diagrams to explain the function generator according to FIG. 2.

FIG. 2 shows an example of an embodiment of a function generator 31 usable in the circuit arrangement according to FIG. 1. A pulse signal the frequency of which is proportional to the output rotation rate V of the gearbox 5 is fed to an input 41. The signal is fed through a frequency-voltage converter 43 to the non-inverting input of an operation amplifier 45, the gain of which, for the formation of a voltage proportional to the input rotation rate N of the gearbox 5, is adjustable according to the selected gear stage. For this purpose conventionally there are connected to the inverting input of the operation amplifier 45 a feedback resistor 47 leading to the output and several resistors 49, 51, 53, 55 connectable to ground. The ratio of the resistor 47 to the individual resistors 49 to 55 is selected in dependence upon the transmission ratios of the individual gears. The switch $S_R$ is closed when reverse gear is engaged; the switches $S_1$, $S_2$ and $S_3$ are closed on engagement of the first to third gears. If further gears are provided, additional switches and resistors are to be provided. At the output of the operation amplifier 45 a signal is available which is proportional to the input rotation rate N of the gearbox 5. A comparator 57 compares the signal proportional to the input rotation rate N with a signal proportional to the engine rotation rate n which is fed through a frequency-voltage converter 59 to its inverting input. The comparator 57 controls an electronic switch 61 which is closed when the engine rotation rate n is greater than or equal to the input rotation rate n of the gear 5. If the engine rotation rate n is lower, the switch 61 is opened.

Figure 3A:
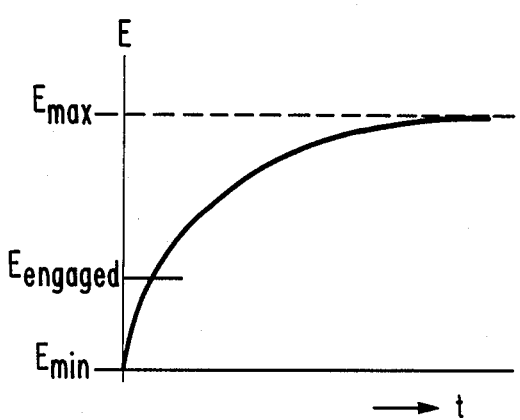
Figure 3B:
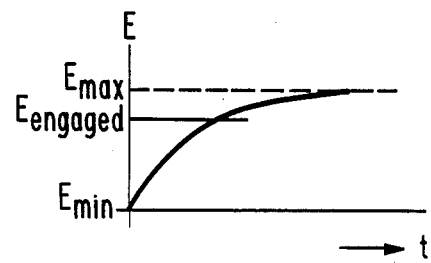

The switch 61 is connected into a first charging circuit of a capacitor 63 which is charged up through a second charging circuit, when the clutch is released, to a predetermined initial level $E_{min}$ (FIGS. 3a, b). The second charging circuit comprises an electronic switch 65 which in the presence of one of the clutch-release conditions is closed by the clutch-release control 21 and connects the capacitor 63 with an adjustable voltage source 67, for example in the form of a potentiometer. An electronic switch 69 connects the capacitor 63, through a charging resistor 71, with a second adjustable voltage source 73, through which it is charged up to a voltage level $E_{max}$ when the clutch-release control 21 closes the switch 69 for the setting in action of the function generator 31.

Through the switch 61 several resistors 75, 77, 79 are connected in parallel with the resistor 71, and each can be connected-in through an additional, series-connected switch $S_{R/1}$, $S_2$ and $S_3$ etc. The switches $S_{R/1}$, $S_2$, $S_3$ are closed in dependence upon the engaged ratio of the gearbox 5 and fix the time constant with which the capacitor 63 is charged up, starting from the voltage level $E_{min}$, to the voltage level $E_{max}$. Moreover in parallel with the resistor 71 a further resistor 81 is connected through a switch S which is closed when the second or a higher gear ratio is engaged and likewise influences the charging time constant of the capacitor 63. The resistors 75, 55, 79 and 81 are so dimensioned that in the individual gear ratios different speeds of rise of the voltage level of the capacitor 63 result. An amplifier 83 connected with the capacitor 63 supplies the output signal of the function generator 31 to the adder stage 29 and the change-over switch 17.

In a practical example of an embodiment with a 5-speed gear, the resistors were so dimensioned that the slipping range was run through in the clutch engagement times according to the following table:

| gear | engine brakes n < N | charge resistor | engine accelerates n ≧ N | charge resistor |
|---|---|---|---|---|
| 1/R | 4.8 sec. | R 71 | 1.6 sec. | R 71//R 81//R 75 |
| 2 | 2.4 sec. | R 71//R 81 | 0.4 sec. | R 71//R 81//R 77 |
| 3 | " | " | 0.2 sec. | R 71//R 81//R 79 |
| 4 | " | | 0.1 sec. | |
| 5 | " | | 0.05 sec. | |

It is the advantage of the separate adjustment of $E_{min}$ and $E_{max}$ that the speed program which engages the clutch acording to an exponential time function can be adjusted so that the clutch engagement speed is retarded in an engagement position in which the clutch is nearly closed, that is to say has to transmit great torques. As shown by the course of the voltage level on the capacitor 63 in dependence upon the time t in FIGS. 3a and b, the time course of the voltage level in the region of the level $E_{engaged}$ completely engaging the clutch is more greatly curved when the maximum voltage level $E_{max}$ is brought closer to the level $E_{engaged}$. Thus by variation of the level $E_{max}$ it is possible to vary the clutch engagement time in the range of great torque transmission. The adjustable voltage sources 73 and 67 can be in specific utilization cases also be replaced by fixed resistors or the like.

The circuit arrangement according to FIGS. 1 and 2 can be realized in digital form, especially in the form of a micro-processor.

While specific embodiments of the invention have been shown and described in detail to illustrate the application of the inventive principles, it will be understood that the invention may be embodied otherwise without departing from such principles.

What is claimed is:

1. Automatic clutch actuation system for a motor vehicle, comprising a combustion engine (1), a change speed gearbox (5) with an input shaft and an output shaft, wherein said gearbox (5) is shiftable between a reverse gear and a plurality of forward gears with the ratios of the gear output shaft rotation rate to the gear input shaft rotation gear being different from one another, a friction clutch (3) arranged in the torque transmission path between said combustion engine (1) and said input shaft of said change-speed gearbox (5), said friction clutch (3) comprises an actuating element (9) and a positioning servo-drive (11) for moving said actuating element (9) between a released position in which said clutch (3) is disengaged and an engaged position in which said clutch (3) is completely engaged, and also affords adjustment within a slipping position range of clutch positions between a torque transmission commencing position and said engaged position, a first tachometer for producing first rotation rate signal corresponding to the rotation rate of said combustion engine, a second tachometer (21, 33, 35) for producing a second rotation rate signal corresponding to the rotation rate of said input shaft of said change-speed gearbox (5), means (37) for controlling the gear position of said change-speed gearbox (5), a positioning control means (17, 19, 21) for controlling the position of said positioning servo-drive (11), said position control means (17, 19, 21) being responsive to said first tachometer (23) and said second tachometer (21, 33, 35) and to said gear position control means (37), a first function generator (27) for said positioning control means (17, 19, 21) for producing predetermined rotation rate characteristic between the rotation rate of said combustion engine (1) and the clutch position, wherein said positioning control means (17, 19, 21) for starting in reverse gear or in forward gear with the smallest ratio of output shaft rotaton rate to input shaft rotation rate, responds to said first function generator (27) and said actuating element (9) adjusts in said slipping range in dependence upon the rotation rate of said combustion engine (1) and providing a position of said actuating member (9) determined by means of a predetermined rotation rate position characteristic assigned to each rotation rate of said combustion engine (1), and a second function generator (31) for said positioning control means (17, 19, 21), providing a plurality of predetermined position characteristics for adjusting the clutch position as a function of time over the slipping position range of clutch positions, said positioning control means (17, 19, 21) responds to said second function generator (31) when changing the forward gears and adjusts said actuating element (9) in dependence on a first one of said predetermined position characteristics when the rotation rate of said input shaft and in dependence on a second one of said predetermined position characteristics whereby said actuating member (9) is moved more slowly over the slipping position range of clutch positions than during the first one of said predetermined position characteristics when the rotation rate of said combustion engine (1) is smaller than the rotation rate of said input shaft.

2. System according to claim 1, characterized in that a computer circuit provides said gear input shaft rotation rate by multiplying a signal from said second tachometer, proportional to the gear output rotation rate of the output shaft rotation rate of said change-speed gearbox, with a factor selected in response to the gear shift position of said change-speed gearbox and representative of the ratio of said gear input shaft rotation rate to said gear output shaft rotation rate.

3. System according to claim 1, characterized in that said first and second function generators, at least in the case of engine output rotation rate higher than said gear input shaft rotation rate responds to said gear shift position of said change-speed gearbox and selects different position characteristics of said second function generator for the individual gear shift positions or for groups of said gear shift positions, faster position characteristics being engaged with increasing ratio of said gear output rotation rate to said gear input rotation rate.

4. System according to claim 3, characterized in that for said gear input shaft rotation rates of said change-speed gearbox above a prescribed rotation rate value a separate position characteristic of said second function generator is provided for each forward gear shift position with the exception of the forward gear shift position with the lowest ratio of said gear output shaft rotation rate to said gear input shaft rotation rate.

5. System according to claim 3, characterized in that said position control means selects a position characteristic of said second function generator provided for the reverse gear and/or the forward gear with the lowest ratio of said gear output rotation rate to said gear input rotation rate when a signal, proportional to said gear output shaft rotation rate of said change-speed gearbox, from said tachometer, lies above a predetermined value.

6. System according to claim 1, characterized in that said second function generator comprises a capacitor connected to a charging circuit and a resistor network having a plurality of selectable resistor stages connected to said charging circuit or a discharge circuit discharging said capacitor, and in that said position control means controls the selection of said resistor stages.

7. System according to claim 1, characterized in that said position control means comprises a third function generator controlling the position of said actuating element independently of said first function generator for providing a position characteristic superimposed upon said position characteristic of said first function generator and for displacing said actuating element as a function of time over said slipping position range, and in that said position control means responds to said second tachometer providing a signal proportional to the gear output shaft rotation rate of the output shaft of said change-speed gearbox and responsive to the forward gear shift position of said change-speed gearbox and enables said third function generator in addition to said first function generator when said gear output rotation rate is higher than a predetermined value and a forward gear is engaged having a ratio of said gear output rotation rate to said gear input rotation rate higher than the lowest ratio of the forward gears and said gear input rotation rate is below a predetermined value.

8. System according to claim 7, characterized in that said position control means additionally enables said third function generator after the elapse of a predetermined time period after enabling said first function generator.

9. System according to claim 8, characterized in that said predetermined time period varies in dependence upon the square of said engine control output rotation rate.

* * * * *